(12) United States Patent  
Lane

(10) Patent No.: US 8,341,155 B2  
(45) Date of Patent: Dec. 25, 2012

(54) ASSET ADVISORY INTELLIGENCE ENGINE FOR MANAGING REUSABLE SOFTWARE ASSETS

(75) Inventor: Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/011,260

(22) Filed: Jan. 21, 2011

(65) Prior Publication Data

US 2011/0119223 A1     May 19, 2011

Related U.S. Application Data

(63) Continuation-in-part of application No. 12/034,508, filed on Feb. 20, 2008, now abandoned.

(51) Int. Cl.
*G07F 7/00* (2006.01)
*G07F 17/30* (2006.01)

(52) U.S. Cl. .................. 707/736; 707/738; 707/754

(58) Field of Classification Search ............... None
See application file for complete search history.

(56) References Cited

U.S. PATENT DOCUMENTS

| | | | |
|---|---|---|---|
| 6,256,773 | B1 | 7/2001 | Bowman-Amuah |
| 6,539,396 | B1 | 3/2003 | Bowman-Amuah |
| 6,799,174 | B2 | 9/2004 | Chipman et al. |
| 7,080,064 | B2 | 7/2006 | Sundaresan |
| 7,099,859 | B2 | 8/2006 | Sundaresan |
| 7,103,871 | B1 | 9/2006 | Kirkpatrick et al. |
| 7,225,241 | B2 | 5/2007 | Yada |
| 7,318,055 | B2 | 1/2008 | Britton et al. |
| 7,483,973 | B2 | 1/2009 | An et al. |
| 7,526,501 | B2 | 4/2009 | Albahari et al. |
| 7,546,295 | B2 | 6/2009 | Brave et al. |

(Continued)

FOREIGN PATENT DOCUMENTS

WO     2007113164     10/2007

OTHER PUBLICATIONS

A. Rauschmayer and P. Renner, Knowledge-Representation-Based Software Engineering, Technical Report 0407, Ludwig-Maximilians-Universitat Munchen, Institut fur Informatik, May 2004.*

(Continued)

*Primary Examiner* — Jay Morrison
(74) *Attorney, Agent, or Firm* — Patents on Demand P.A.; Brian K. Buchheit; Scott M. Garrett

(57) ABSTRACT

Providing intelligent recommendations of reusable software assets can begin with obtaining semantic topic maps that define semantic relationships between topics. A topic can represent a requirement or a reusable software asset. A semantic topic map can be written in accordance with a semantic framework using a Web ontology language and stored in a semantic Web repository. User-entered search criteria, representing a requirement, a user-selected search results filter, or a reusable software asset, can be received. A set of semantic topic maps can be identified for the user-entered search criteria. A set of inferred data items can be inferred from the set of identified semantic topic maps. The contents of both sets can be aggregated into a results table. A semantic results graph, a pictorial representation of topics and relationships, can be synthesized from the results table. The semantic results graph can be rendered within an associated user interface.

22 Claims, 10 Drawing Sheets

U.S. PATENT DOCUMENTS

| | | | |
|---|---|---|---|
| 1,260,565 | A1 | 10/2009 | Coldicott et al. |
| 7,890,517 | B2 | 2/2011 | Angelo et al. |
| 7,979,840 | B2 | 7/2011 | Zhang et al. |
| 2002/0073106 | A1 | 6/2002 | Parker et al. |
| 2003/0009740 | A1 | 1/2003 | Lan |
| 2005/0050311 | A1 | 3/2005 | Joseph et al. |
| 2005/0050549 | A1 | 3/2005 | Joseph et al. |
| 2005/0138113 | A1 | 6/2005 | Brendle et al. |
| 2006/0015489 | A1 | 1/2006 | Probst et al. |
| 2006/0047810 | A1 | 3/2006 | Herzog et al. |
| 2006/0070083 | A1 | 3/2006 | Brunswig et al. |
| 2006/0229896 | A1 | 10/2006 | Rosen et al. |
| 2006/0236307 | A1 | 10/2006 | Debruin et al. |
| 2006/0241931 | A1 | 10/2006 | Abu el Ata et al. |
| 2007/0073663 | A1 | 3/2007 | McVeigh et al. |
| 2007/0088683 | A1* | 4/2007 | Feroglia et al. ............ 707/4 |
| 2007/0112712 | A1 | 5/2007 | Flinn et al. |
| 2007/0233681 | A1* | 10/2007 | Ronen et al. ............ 707/8 |
| 2007/0239768 | A1 | 10/2007 | Quinn-Jacobs |
| 2007/0271277 | A1 | 11/2007 | Ivan et al. |
| 2008/0126397 | A1 | 5/2008 | Alexander et al. |
| 2008/0127047 | A1 | 5/2008 | Zhang et al. |
| 2008/0134137 | A1 | 6/2008 | Petersen |
| 2008/0215358 | A1 | 9/2008 | Goldszmidt et al. |
| 2008/0215400 | A1 | 9/2008 | Ban et al. |
| 2008/0270372 | A1 | 10/2008 | Hsu et al. |
| 2008/0288944 | A1 | 11/2008 | Coqueret et al. |
| 2008/0319947 | A1* | 12/2008 | Latzina et al. ............ 707/3 |
| 2009/0064087 | A1 | 3/2009 | Isom |
| 2009/0077043 | A1 | 3/2009 | Chang et al. |
| 2009/0089078 | A1 | 4/2009 | Bursey |
| 2009/0109225 | A1 | 4/2009 | Srivastava et al. |
| 2009/0112908 | A1 | 4/2009 | Wintel et al. |
| 2009/0138293 | A1 | 5/2009 | Lane et al. |
| 2009/0157801 | A1* | 6/2009 | Barber et al. ............ 709/203 |
| 2009/0158237 | A1 | 6/2009 | Zhang et al. |
| 2009/0182610 | A1 | 7/2009 | Palanisamy et al. |
| 2009/0182750 | A1 | 7/2009 | Keyes et al. |
| 2009/0193057 | A1 | 7/2009 | Maes |
| 2009/0193432 | A1 | 7/2009 | McKegney et al. |
| 2009/0201917 | A1 | 8/2009 | Maes et al. |
| 2009/0204467 | A1 | 8/2009 | Rubio et al. |
| 2009/0210390 | A1 | 8/2009 | Lane |
| 2010/0161629 | A1 | 6/2010 | Palanisamy et al. |
| 2011/0035391 | A1 | 2/2011 | Werner et al. |
| 2011/0153292 | A1 | 6/2011 | Lane et al. |
| 2011/0153293 | A1 | 6/2011 | Coldicott et al. |
| 2011/0153608 | A1 | 6/2011 | Lane et al. |
| 2011/0153610 | A1 | 6/2011 | Carrato et al. |
| 2011/0153767 | A1 | 6/2011 | Coldicott et al. |
| 2011/0238610 | A1 | 9/2011 | Lee et al. |

OTHER PUBLICATIONS

U.S. Appl. No. 12/605,660, filed Oct. 10, 2009, Coldicott et al.

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

Chen, D-W et al.; "A P2P based Web service discovery mechanism with bounding deployment and publication"; Chines Journal of Computers; vol. 28; No. 4; pp. 615-626; Apr. 2005.

Lee, J. et al.; "Semantic and Dynamic Web Service of SOA based Smart Robots using Web 2.0 Open API", 2008; Sixth International Conference on Software Engineering, Research, management and Application; pp. 255-260.

Demirkan, H. et al.; "Service-oriented technology and management; Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computer machinery Inc. 978-1-60558-432-4/09/0006; Jun. 2009; pp. 147-154.

Kanakalata et al.; Performance Optimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Reaslization of SOA Deployment Patterns in Distributed Environments", ICSOC 2008; LNCS 5364; 2008; pp. 162-179.

* cited by examiner

ASSET ADVISORY INTELLIGENCE ENGINE FOR MANAGING REUSABLE SOFTWARE ASSETS

CROSS-REFERENCE TO RELATED APPLICATIONS

This continuation-in-part application claims the benefit of U.S. patent application Ser. No. 12/034,508 filed Feb. 20, 2008.

BACKGROUND

The present invention relates to the field of information service architectural design.

The ability to reuse software assets represents a significant time-savings when designing new software solutions, especially in a service-oriented architecture (SOA) environment. Reusable software assets often embody knowledge that is specific to the solution's requirements, both functional and non-functional, the architect designing the solution, and/or the industry to which the solution pertains. As used herein, the term "reusable software asset" is used to refer to a variety of data utilized in the development of software solutions (e.g., Web services, software applications, etc.). Examples of reusable software assets can include, but are not limited to, pattern specifications, pattern implementations, data models, software code modules, and the like.

Some reusable software assets represent an aggregate of assets. For example, a pattern asset often includes a pattern specification, one or more pattern implementations, and one or more feature design specifications. Therefore, a pattern asset is capable of assuming a number of forms represented by the total number of distinct permutations of its sub-components.

BRIEF SUMMARY

One aspect of the disclosure can include a method, computer program product, and computer system for providing intelligent recommendations of reusable software assets. In the aspect, a computer can receive at least one user-entered search criteria representing at least one requirement for a software solution, a user-selected filter for search results, and a reusable software asset identifier. The computer can identify a set of at least one semantic topic map associated with the at least one user-entered search criteria. The topic map set can be a subset of a plurality of semantic topic maps. Each semantic topic map of the plurality can defines at least one semantic relationship between topics. A topic can represent one of a requirement and a reusable software asset. Each semantic topic map of the plurality can be written in accordance with a semantic framework using a Web ontology language. Each semantic topic map can be stored in a semantic Web repository. The computer can aggregate contents of the topic map set and the set of inferred data items into a results table. The computer can synthesize a semantic results graph from the results table. The semantic results graph can be a pictorial representation of semantically related topics contained in the results table. The semantic results graph is a graph able to be rendered within a display area of an associated user interface.

One aspect of the disclosure can include a computer system for providing intelligent recommendations of reusable software assets. The computer system can include one or more processors, one or more computer-readable memories, and one or more computer-readable, tangible storage devices. The computer-readable, tangible storage devices can comprise a plurality of semantic topic maps that define relationships between topics. A topic can represent a requirement and/or a reusable software asset. The semantic topic map can be written in accordance with a semantic framework using a Web ontology language. The system can include program instructions, stored on at least one of the one or more storage devices for execution by at least one of the one or more processors via at least one of the one or more memories, to provide guidance for selection of reusable software assets in designing a software solution. The system can include program instructions, stored on at least one of the one or more storage devices for execution by at least one of the one or more processors via at least one of the one or more memories, to synthesize a semantic results graph from semantic topic maps determined as applicable to at least one user-provided search criteria. The semantic results graph can be a pictorial representation of semantic relationships between topics of the applicable semantic topic maps.

One aspect of the disclosure can include a computer program product for providing intelligent recommendations of reusable software assets. The computer program product can include one or more computer-readable, tangible storage devices and program instructions, stored on at least one of the one or more storage devices. The program instructions can be obtain a plurality of semantic topic maps. A semantic topic map can define at least one semantic relationship between topics. A topic can represent a requirement or a reusable software asset. The semantic topic map can be written in accordance with a semantic framework using a Web ontology language. Each semantic topic map can be stored in a semantic Web repository. The program instructions can receive at least one user-entered search criteria representing at least one requirement for a software solution, a user-selected filter for search results, and a reusable software asset identifier. The program instructions can identify a set of at least one semantic topic map associated with the at least one user-entered search criteria. The program instructions can infer from the set of at least one identified semantic topic map a set of at least one inferred data item representing at least one of an auxiliary data relationship to a topic contained in a semantic topic map that is not a member of the set of at least one identified semantic topic map and an applicable auxiliary data element from a semantic topic map that is not a member of the set of at least one identified semantic topic map. The program instructions can aggregate contents of the set of at least one identified semantic topic map and the set of at least one inferred data item into a results table. The program instructions can synthesize a semantic results graph from the results table. The semantic results graph can be a pictorial representation of semantically related topics contained in the results table. The program instructions can render the semantic results graph within a display area of an associated user interface.

DETAILED DESCRIPTION

Figure 1:
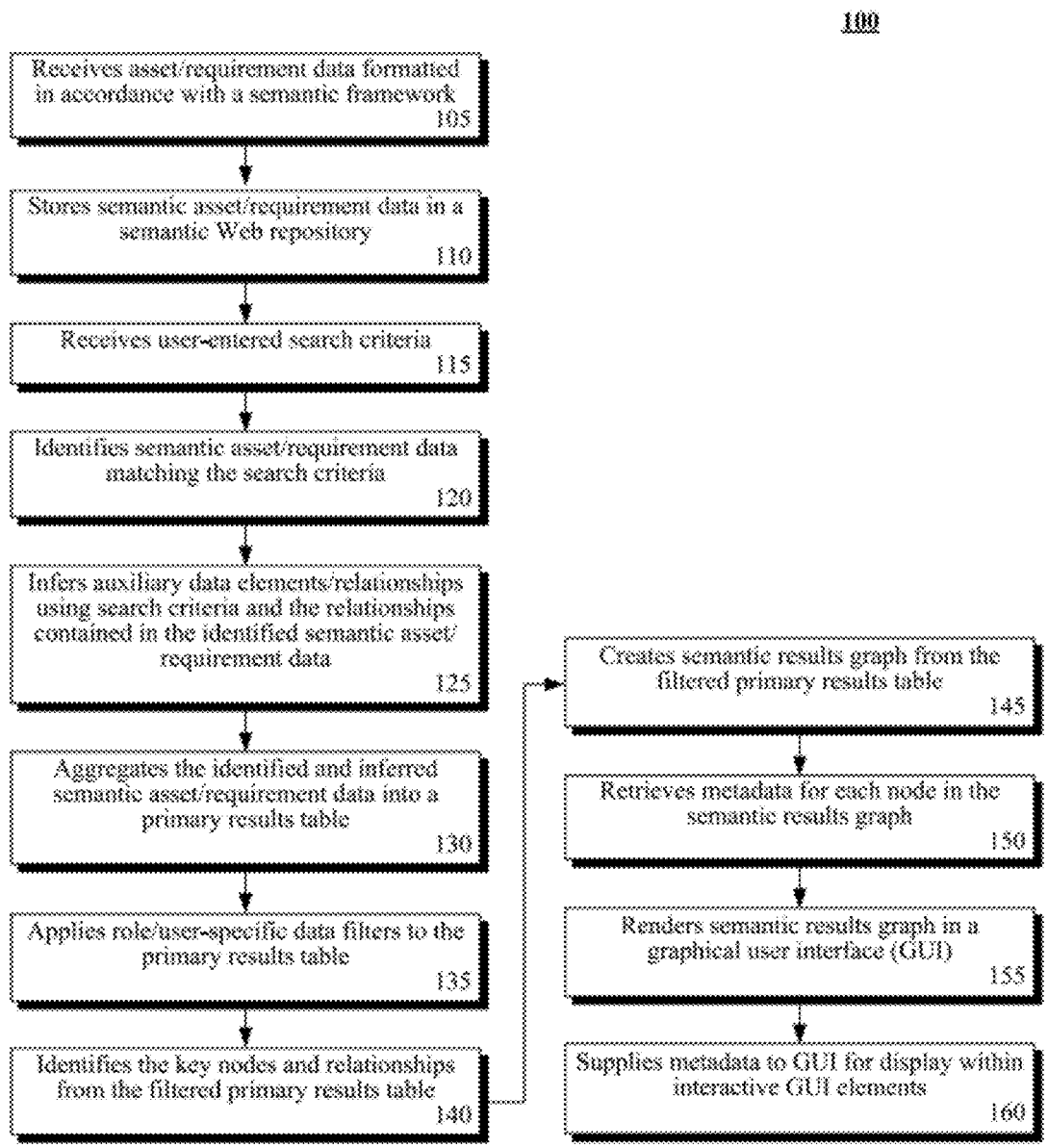
FIG. 1 is a flow chart of a method detailing the operation of an asset intelligence engine for an asset advisory tool in accordance with embodiments of the inventive arrangements disclosed herein.

Some automated tools exist to assist solution architects in identifying reusable software assets that match an entered set of search criteria. However, these conventional automated tools are only effective when the reusable software assets are catalogued using meaningful criteria.

Moreover, even when the reusable software assets are catalogued according to meaningful criteria, these conventional tools still fail to capture knowledge about or the relationships between the assets, functioning only as an unintelligent search tool. The context in which the assets have been used successfully is thus lost and the learning process must be reiterated for each new solution.

For example, a conventional automated tool will provide a user with a list of reusable assets that have been identified for a specific requirement. However, the automated tool will not "tell" the user which assets should or should not be used together. As such, the users are required to capture this knowledge outside of the automated tool, requiring manual correlation of the knowledge and the tool results. These problems with conventional approaches were discovered by the inventors of the disclosure in the course of developing the invention.

The present disclosure provides a solution for providing intelligent recommendations of reusable software assets. An asset intelligence engine can be utilized in conjunction with an asset advisory tool and semantic topic maps. The semantic topic maps can define semantic relationships between topics, which can represent requirements or reusable software assets. The semantic topic maps can be written in accordance with a semantic framework using a Web ontology language and stored in a semantic Web repository. For user-entered search criteria, the asset intelligence engine can generate a semantic results graph from applicable semantic topic maps. Data included in the semantic results graph can also include data inferred by the asset intelligence engine from the applicable semantic topic maps. The semantic results graph can be a pictorial representation of the reusable software assets and/or requirements and their semantic relationships that pertain to the user-entered search criteria.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of a method 100 detailing the operation of an asset intelligence engine for an asset advisory tool in accordance with embodiments of the inventive arrangements disclosed herein. As used herein, the term "asset" is used to refer to a reusable software asset. Examples of assets can include, but are not limited to, pattern specifications, pattern implementations, data models, software code modules, and the like.

Method 100 can begin in step 105 where the asset intelligence engine of the asset advisory tool can receive asset and/or requirement data formatted in accordance with a predetermined semantic framework. As used herein, the term "requirement" represents a specific feature, element, or function that the software solution created from the assets is to provide. As such, requirements can be generally categorized as functional (i.e., pertaining to the operation of the software) or non-functional (i.e., cosmetic or not affecting software operation).

The predetermined semantic framework can allow for the capture of information regarding the relationships that a specific asset or requirement has to other assets and/or requirements. In a preferred embodiment, the asset and/or requirement data can be represented as topic map, per the standard ISO/IEC 13250:2003, using the resource description framework (RDF) and the Web ontology language (OWL) defined by the World Wide Web Consortium.

The asset intelligence engine can store the semantic asset/requirement data in a semantic Web repository in step 110. A semantic Web repository can represent a data storage system configured for the storage of the ontology, as well as data written using a semantic framework and ontology. SESAME RDF SERVER and BOCA can represent examples of semantic Web repositories.

In step 115, the asset intelligence engine can receive user-entered search criteria. The user-entered search criteria can represent the specific asset or requirement for which the user wants additional asset information.

The asset intelligence engine can identify semantic asset/requirement data matching the user-entered search criteria in step 120. In step 125, the asset intelligence engine can infer auxiliary data elements and/or relationships utilizing the user-entered search criteria and/or the relationships contained in the identified semantic asset/requirement data. In step 125, the asset intelligence engine can use an inference engine to derive logical assertions from the identified semantic asset/requirement data.

For example, if the pattern specification "Authenticate User" satisfies the "Security" requirement and the "SSL Service" pattern implementation satisfies the "Authenticate User" pattern specification, then it can logically follow that the "SSL Service" pattern implementation can satisfy the "Security" requirement when used with the "Authenticate User" pattern specification.

Since the semantic asset/requirement data is written using RDF and OWL, and OWL is based upon the extensible markup language (XML), the asset intelligence engine, in steps 120 and/or 125, can utilize semantic Web XML/RDF-based query languages like the SPARQL Protocol and RDF Query Language (SparQL). The use of such query languages can allow the creation of robust queries for inferring new data as well as other functions like consistency checking. Further, the asset intelligence engine can use XML-based security standards to enhance access control functions for the semantic asset/requirement data.

The asset intelligence engine can aggregate both the identified and inferred semantic asset/requirement data into a primary results table in step 130. The primary results table can represent the totality of data that the asset intelligence engine has found to be pertinent to the user-entered search criteria.

The asset intelligence engine can apply role and/or user-specific data filters to the primary results table in step 135. Many asset management systems can utilize the concept of user roles for the purposes of controlling access to and/or operations performed upon the assets stored in the system. This same concept can be extended to the operation of the asset intelligence engine so users are not unintentionally provided access to assets.

A user-specific filter can represent a user-selected presentation parameter. The user-specific filter can be selected when the user enters the search criteria. For example, the user enters the search criteria "Data Handler Service" and selects that the results should contain only requirements (i.e., the user wants to know what requirements are related to the "Data Handler Service").

Step 135 can be expanded upon to accommodate situations where key nodes, as hereinafter defined, are filtered from the primary results table. For example, if the role of the inquiring user eliminates a large portion of the key nodes from the primary results table, the asset intelligence engine can provide the user with notification of his or her role restriction to the semantic asset/requirement data. The user can then review his or her search criteria for errors or discuss his or her role restrictions with the system administrator.

After execution of step 135, the primary results table can contain data that satisfies the user-entered search criteria, has been inferred as relevant to the search criteria, and has not been removed by role/user-specific filtering.

In step 140, the asset intelligence engine can identify the key nodes and their relationships from the filtered primary results table. The key nodes can represent those assets and/or requirements that are related to the user-entered search criteria to a predefined depth or level.

For example, searching on asset 'A' can result in assets 'C' and 'D' as well as assets 'K', 'L', and 'P' that relate to asset 'C' and assets 'Q' and 'V' associated with asset 'D'. Since it is possible to accumulate data for assets and/or requirements that are indirectly related to the focus of the search, it can be more meaningful to initially limit the scope (i.e., four nodes of separation from the source/root node).

The asset intelligence engine can keep nodes and relationships not identified as a "key node" or "key relationship" in step 140 for later use. For example, the asset intelligence engine can show key nodes at the depth limit as having additional data like a collapsed branch of a tree structure that the user can expand on-demand with those nodes and relationships being dynamically presented.

From the filtered primary results table, the asset intelligence engine can create a semantic results graph in step 145. The semantic results graph can be a graphical representation of the key nodes and their relationships. In step 150, the asset intelligence engine can retrieve metadata for each node contained in the semantic results graph from its corresponding storage location. The metadata can comprise various data items defined for each stored asset, such as the type of asset, its owner, and its location in the repository.

It should be noted that the metadata can be associated with the actual asset and not the semantic asset data representing that asset. Thus, the metadata can be maintained separately as part of the asset management system without affecting the contents of the semantic asset data.

In step 155, the asset intelligence engine can render the semantic results graph within a viewing area of a user interface, such as a graphical user interface (GUI) or a web user interface (WUI), associated with the asset advisory tool and/or asset management system, depending upon implementation of the asset advisory tool. As the user interacts with the rendered semantic results graph, in step 160, the asset intelligence engine can supply the retrieved metadata for display within various interactive GUI or WUI elements like pop-up windows and fly-over windows.

The asset intelligence engine can dynamically generate the semantic results graphs, and, therefore, can reflect changes made to the semantic asset/requirement data over time. That is, as the knowledgebase contained within the semantic asset/requirement data, the assets and/or combination of assets presented to the user within the semantic results graph can also change over time.

Figure 2:
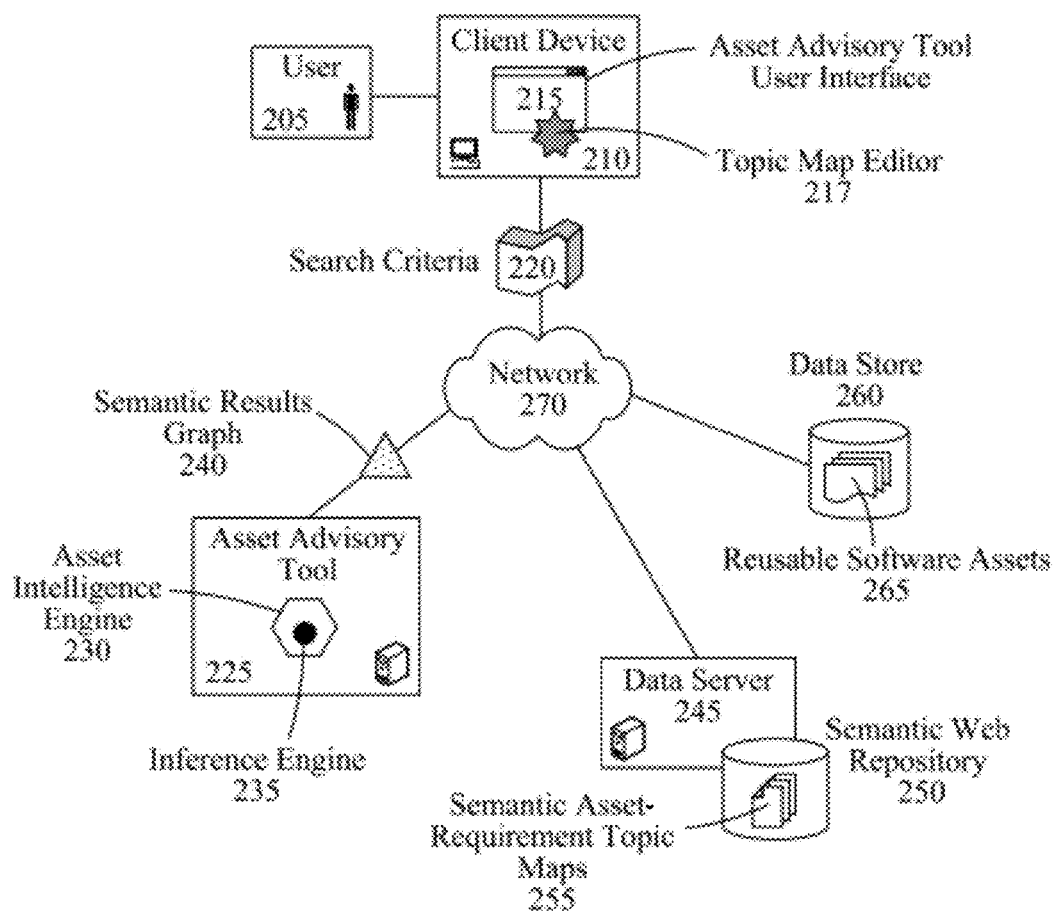
FIG. 2 is a schematic diagram illustrating a system that utilizes an asset intelligence engine for an asset advisory tool to provide intelligent recommendations for reusable software assets in accordance with an embodiment of the inventive arrangements disclosed herein.

FIG. 2 is a schematic diagram illustrating a system 200 that utilizes an asset intelligence engine 230 for an asset advisory tool 225 to provide intelligent recommendations for reusable software assets 265 in accordance with embodiments of the inventive arrangements disclosed herein. System 200 can perform the steps of method 100.

In system 200, a user 205 can create one or more semantic asset-requirement topic maps 255, herein referred to as semantic topic maps 255, for use by the asset intelligence engine 230 of the asset advisory tool 225 to recommend one or more reusable software assets 265, herein referred to as assets 265, for a set of search criteria 220.

Assets 265 can be contained in a data store 260 that the user 205 can access over the network 270. Data store 260 can be a component of an asset management system (not shown).

The user 205 can create a semantic topic map 255 using a topic map editor 217 presented within the asset advisory tool user interface 215. The asset advisory tool user interface 215 can be a user interface, such as a GUI or WUI, running on a client device 210 that allows the user 205 to interact with the asset advisory tool 225. The client device 210 can represent a variety of computing devices capable of supporting operation of the asset advisory tool user interface 215 and communicating with the asset advisory tool 225 over the network 270.

The topic map editor 217 can represent an interface component of the asset advisory tool user interface 215 configured to handle the creation, modification, and storage of the semantic topic maps 255. In another embodiment, the topic map editor 217 can be a separate software application accessed independent from the asset advisory tool user interface 215.

The semantic topic maps 255 can be stored in a semantic Web repository 250 of a data server 245 that is accessible over the network 270. The data server 245 can represent the hardware and/or software components that manage access to the semantic Web repository 250 over the network 270.

The semantic Web repository 250 can represent the hardware and/or software required to store an ontology, as well as data written using a semantic framework and the ontology. SESAME RDF SERVER and BOCA can represent examples of semantic Web repository 250.

A semantic topic map 255 can be a representation of a software requirement or asset 265 as a topic map, as defined by the standard ISO/IEC 13250:2003, that utilizes a semantic framework. As used herein, the term "requirement" represents a specific feature, element, or function that the software solution created from the assets is to provide. As such, requirements can be generally categorized as functional (i.e., pertaining to the operation of the software) or non-functional (i.e., cosmetic or not affecting software operation).

The predetermined semantic framework can allow for the capture of information regarding the relationships that a specific asset 265 or requirement has to other assets 265 and/or requirements. In a preferred embodiment, the semantic topic maps 255 can be represented using the RDF and the OWL defined by the World Wide Web Consortium.

Once semantic topic maps 255 have been created for the assets 265 and requirements, the user 205 can use the asset advisory tool 225 to generate a semantic results graph 240 for entered search criteria 220. The asset advisory tool 225 can be a software application configured to provide intelligent suggestions of assets 265 and/or combinations of assets 265 based upon the search criteria 220 and the semantic topic maps 255.

The asset advisory tool 225 can include an asset intelligence engine 230. The asset intelligence engine 230 can be a software component configured to analyze the semantic topic maps 255 with respect to the search criteria 220 to produce the intelligent suggestions. The asset intelligence engine 230 can utilize an inference engine 235 to perform deductive and/or rule-based reasoning upon the data and relationships of the semantic topic maps 255.

For example, the inference engine 235 can search for assets 265 of data store 260 that match specifics of one or more of the search criteria 220. One or more of the matched assets can have a relationship with another asset 265. The relationships can embody different semantic associations. For instance, different semantic associations can include, but are not limited to, an "is satisfied by" relationship, a "has an occurrence of" relationship, an "is used with" relationship, an "is an instance of" relationship, an "is an implementation of" relationship, an "is cautioned with" relationship, and the like. Any expressible relationship can be used to define a semantic association between assets 265 in contemplated embodiments of the disclosure.

The inference engine 235 can leverage the semantic associations between assets 265 to produce a comprehensive result to the search criteria 220 that can be based in part upon inferences and assumptions that the inference engine 235 makes. For example, a matched asset 265, referred in this example as a first asset, can be determined that satisfies a significant number of the search criteria 220 elements, but not all. This matched asset can be a specific instance of more general asset 265, referred to as a second asset. The second asset 265 can have an "is used with" relationship with a third asset. The third asset can satisfy elements of the search criteria 220 that the first asset failed to satisfy. Thus, the inference engine 235 can infer that the first asset can be combined with the third asset to satisfy the search criteria. The inference engine 235 can indicate other assets and/or combinations of assets that also satisfy the search criteria and can present the alternatives to a user 205.

In one embodiment, the asset intelligence engine 230 can synthesize the intelligent suggestions for assets 265 and the relationships between those assets 265 into the semantic results graph 240. The semantic results graph 240 can be a graphical representation of the assets 265 and/or requirement pertaining to the search criteria 220 and their relationships.

The client device 210, upon receiving the semantic results graph 240 from the asset advisory tool 225, can present the semantic results graph 240 to the user 205 within the asset advisory tool user interface 215. Thus, the asset advisory tool user interface 215 can present the user 205 with a visual illustration of not only which assets 265 and/or requirements pertain to their search criteria, but also how the assets 265 and/or requirements are semantically related.

Additionally, the semantic results graph 240 can include auxiliary data for the presented assets 265, such as a universal resource locator (URL) to one of the assets 265 in the data store 260.

Network 270 can include any hardware/software/and firmware necessary to convey data encoded within carrier waves. Data can be contained within analog or digital signals and conveyed through data or voice channels. Network 270 can include local components and data pathways necessary for communications to be exchanged among computing device components and between integrated device components and peripheral devices. Network 270 can also include network equipment, such as routers, data lines, hubs, and intermediary servers, which together form a data network, such as a local area network (LAN), a wide area network (WAN), an intranet, or the Internet. Network 270 can also include circuit-based communication components and mobile communication components, such as telephony switches, modems, cellular communication towers, and the like. Network 270 can include line based and/or wireless communication pathways.

As used herein, presented data store 260 can be a physical or virtual storage space configured to store digital information. Data store 260 can be physically implemented within any type of hardware including, but not limited to, a magnetic disk, an optical disk, a semiconductor memory, a digitally encoded plastic memory, a holographic memory, or any other recording medium. Data store 260 can be stand-alone storage units as well as a storage unit formed from a plurality of physical devices. Additionally, information can be stored within data store 260 in a variety of manners. For example, information can be stored within a database structure or can be stored within one or more files of a file storage system, where each file may or may not be indexed for information searching purposes. Further, data store 260 can utilize one or more encryption mechanisms to protect stored information from unauthorized access.

Figure 3:
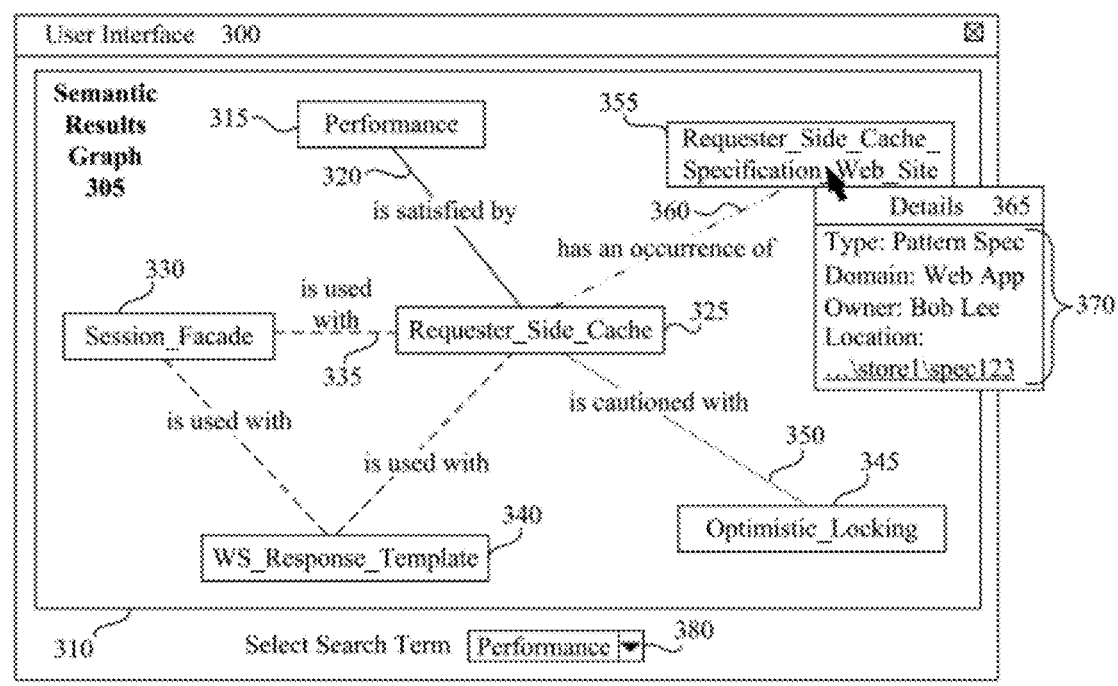
FIG. 3 is an example showing a semantic results graph presented within a user interface in accordance with an embodiment of the inventive arrangements disclosed herein.

FIG. 3 is an example showing a semantic results graph 305 presented within a user interface 300 in accordance with embodiments of the inventive arrangements disclosed herein. The semantic results graph 305 can be generated utilizing the steps of method 100 and/or produced within the context of system 200.

User interface 300 can represent a GUI or WUI in which the semantic results graph 305 is presented to a user. User interface 300 can represent the asset advisory tool user interface 215 of system 200.

It should be emphasized that user interface 300 is meant for illustrative purposes only, and is not intended as an absolute embodiment or limitation to an embodiment of the present disclosure. User interface 300 can include additional GUI or WUI components and elements without impacting or distracting from an embodiment of the present disclosure.

User interface 300 can include a display area 310 in which the semantic results graph 305 can be presented as well as a selector 380 for the search term or criteria driving the semantic results graph 305. As shown in this example, the criteria selector 380 can be implemented as a drop-down menu from which the user can select available requirements or assets.

The terms available to the user via the criteria selector 380 can vary based upon the user's role. For example, a user having a role of "Solution Architect" can be presented with terms for those assets/requirements accessible to the "Solution Architect" role, whereas a user having the "Domain Expert" role would be provided with a broader listing In another contemplated embodiment, the criteria selector 380 can be implemented as a questionnaire or a separate wizard interface. In such an embodiment, an asset intelligence engine, such as asset intelligence engine 230 of FIG. 2, can prompt the user to provide input to one or more predetermined questions or one or more selection lists that the asset intelligence engine can use to generate the semantic results graph 305.

In yet another embodiment, wherein the criteria selector 380 comprises multiple and/or complexly-related criteria selections, the asset intelligence engine can present the criteria selections along with the user's choices alongside the semantic results graph 305 in a separate user interface 300 widget or component. Such an embodiment can allow the user to modify choices for the selection criteria in the criteria selector 380 and have the presentation of the semantic results graph 305 dynamically modified accordingly.

As shown in this example, the semantic results graph 305 can present the user with the nodes 315, 325, 330, 340, 345, and 355 representing the requirements and/or assets pertaining to the item for which the user has initiated a search. The nodes 315, 325, 330, 340, 345, and 355 can be related amongst themselves by various relationships 320, 335A, 335B, 335C, 350, and 360. The relationships 320, 335A, 335B, 335C, 350, and 360 can embody different semantic associations between the nodes 315, 325, 330, 340, 345, and 355.

In this example, the user has performed a search upon the requirement called "Performance". Therefore, the semantic results graph 305 can represent the requirement as the performance node 315. By reading the semantic results graph 305, the user can understand the following about assets/requirements related to the performance node 315.

Firstly, the performance node 315 can have an "is satisfied by" relationship 320 (indicated by the solid line) to the requester_side_cache node 325. In this example, the requester_side_cache node 325 can represent a pattern asset. Therefore, the user can use the requester_side_cache pattern asset to satisfy the performance requirement.

While useful to know what asset to use to satisfy a requirement, the semantic results graph 305 further illustrates additional knowledge about other assets that should or should not be used as part of the solution. The requester_side_cache node 325 can be related to the session_facade node 330 and the WS_response_template node 340 via "is used with" relationships 335A and 335C (indicated by the dashed lines), respectively. Further, the session_facade node 330 can also be connected to the WS_response_template node 340 via "is used with" relationship 335B.

The session_facade node 330 can represent a pattern implementation of the requester_side_cache pattern asset for interacting with JAVA ENTERPRISE BEANS. The WS_response_template node 340 can represent another pattern asset that has been identified as a "best practice" to use with the requester_side_cache pattern asset. This "best practice" knowledge can be captured within a semantic topic map relating the WS_response_template node 340 and the requester_side_cache node 325 with the semantic relationship of "is used with".

Now, the user can understand that the WS_response_template pattern asset and session_facade pattern implementation should be used when using the requester_side_cache pattern asset to satisfy the performance requirement.

The semantic results graph 305 can also show the user that the requester_side_cache node 325 is related to the optimistic_locking node 345 with an "is cautioned with" relationship 350. The optimistic_locking node 345 can represent a pattern implementation for optimistic concurrency control for database records.

In this example, another user (i.e., solution architect, domain expert) could have captured his or her experience of using the optimistic_locking pattern implementation with the requester_side_cache pattern asset with respect to that solution's performance. Thus, this user could have created a semantic topic map to contain this information for use by other users who are attempting to use the requester_side_cache pattern asset to fulfill a performance requirement.

Lastly, the semantic results graph 305 can indicate to the user that the requester_side_cache node 325 has a "has an occurrence of" relationship 360 with the requester_side_cache_specification_Web_site node 355. The requester_side_cache_specification_Web_site node 355 can be a pattern specification that includes or references the requester_side_cache pattern asset. Thus, the requester_side_cache_specification_Web_site pattern specification "has an occurrence of" the requester_side_cache pattern asset.

"Has an occurrence of" relationship 360 can indicate to the user that the requester_side_cache_specification_Web_site pattern specification could be useful starting or reference point for using the requester_side_cache pattern asset to satisfy the performance requirement. The user can then decide to access the requester_side_cache_specification_Web_site pattern specification. To do so, the user would typically need to search for the specific asset in the corresponding data store.

However, an asset advisory tool, such as asset advisory tool 225 of FIG. 2, can further simplify this task by providing the user with such pertinent data about each node 315, 325, 330, 340, 345, and/or 355 within the user interface 300, without the need for the user to access other systems. As described in method 100, the asset intelligence engine can collect metadata about the nodes 315, 325, 330, 340, 345, and 355 presented within the semantic results graph 305.

Therefore, by using the interactive GUI or WUI elements supported by the user interface 300, the asset intelligence engine can quickly provide the metadata for the nodes 315, 325, 330, 340, 350, and 355 to the user. In this example, a flyover window 365 can be rendered when the user positions a selection mechanism (i.e., mouse pointer) over the graphical area representing the requester_side_cache_specification_Web_site node 355.

The asset advisory tool user interface can generate the flyover window 365, which textually displays the previously collected metadata as corresponding data items 370. In this example, the data items 370 can provide the user with the type, domain, owner, and location for the asset represented by the node 355. The location of the asset can be represented as a universal resource locator (URL), allowing the user to directly access the asset from the asset advisory tool.

Figure 4:
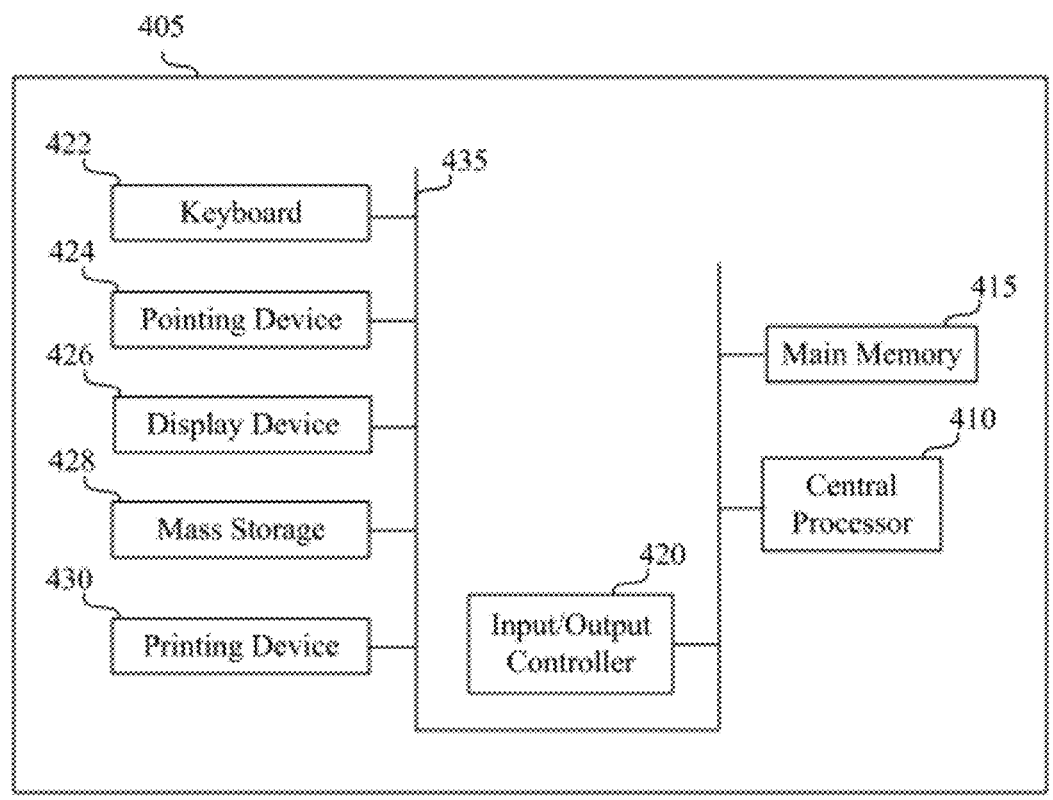
FIG. 4 is a schematic diagram of a system representing a data processing apparatus that can be used to support operation of an asset intelligence engine in accordance with embodiments of the inventive arrangements disclosed herein.
Figure 5:
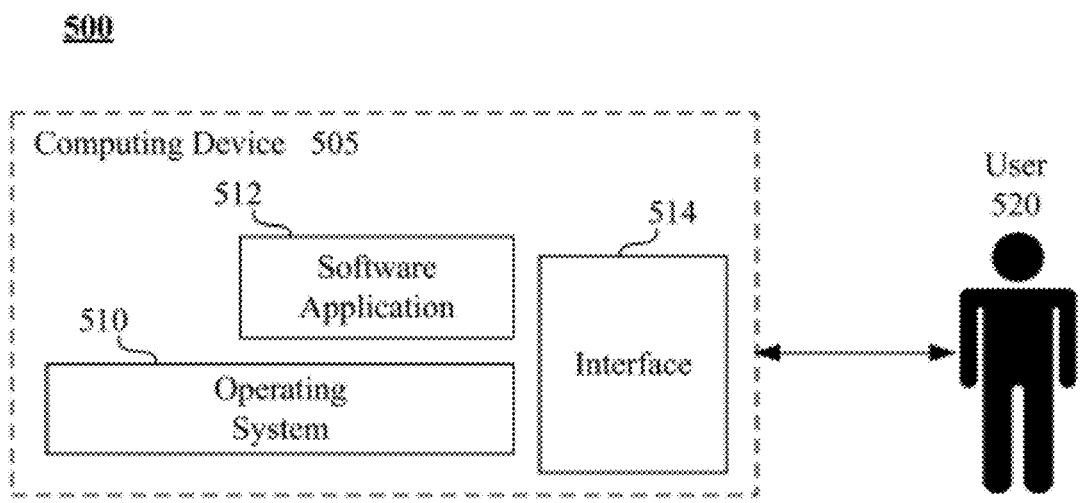
FIG. 5 is a schematic diagram of a system illustrating a computing device for housing a data-processing apparatus in accordance with embodiments of the inventive arrangements disclosed herein.
Figure 6:
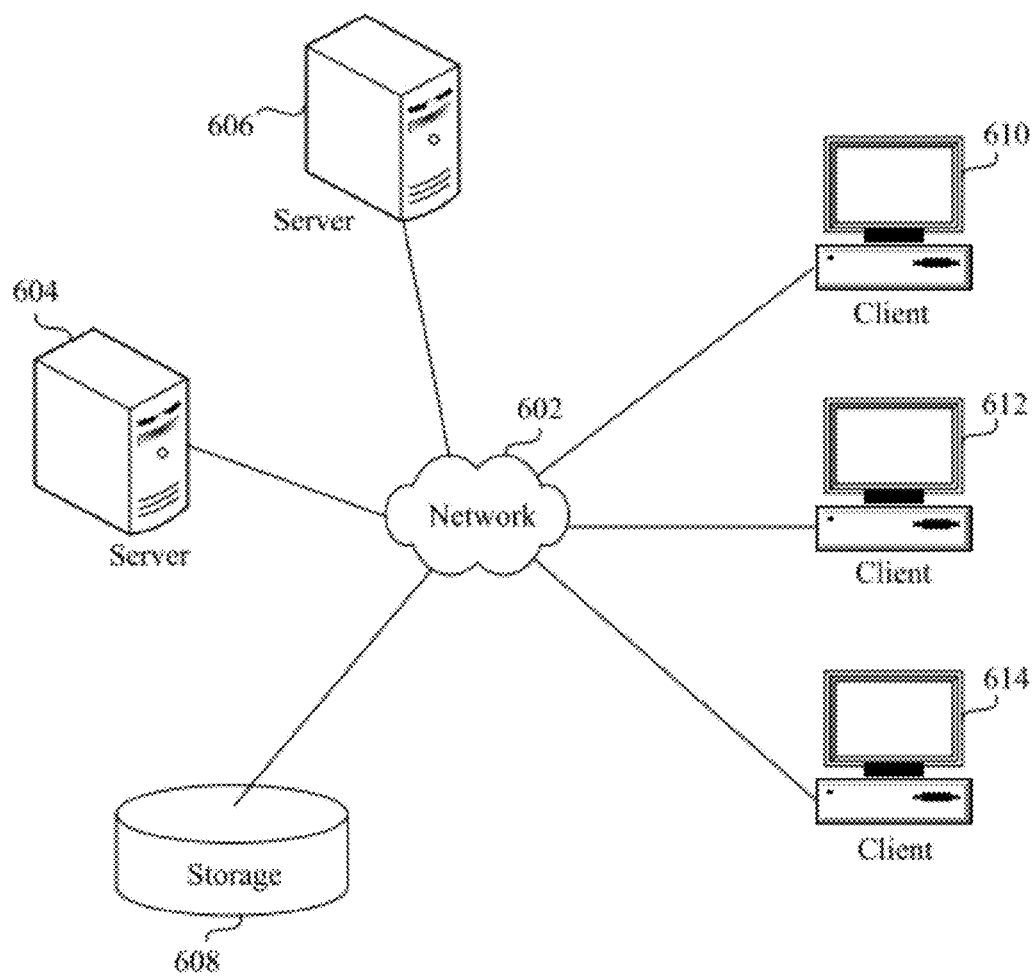
FIG. 6 is a schematic diagram of a system illustrating a networked computing environment that can be used to support operation of an asset intelligence engine in accordance with embodiments of the inventive arrangements disclosed herein.

FIGS. 4-6 can illustrate exemplary diagrams of data processing environments in which embodiments of the present disclosure, such as system 200 of FIG. 2, can be implemented. FIGS. 4-6 are presented for illustrative purposes, and are not intended to assert or imply any limitation with regards to the environments in which aspects or embodiments of the present disclosure can be implemented. A variety of configurations of the presented environments can be used without departing from the spirit and scope of an embodiment of the present disclosure.

FIG. 4 is a schematic diagram of a system 400 representing a data-processing apparatus 405 that can be used to support operating of an asset intelligence engine in accordance with embodiments of the inventive arrangements disclosed herein. System 400 can be used within the context of system 200 and/or to support the performance of method 100. For example, asset intelligence engine 230, asset advisory tool user interface 215, and topic map editor 217 can comprise program instructions stored in a memory 415 or mass storage 428 and able to be executed by one or more processor 410. In one embodiment of the disclosure, computing device 210 can be one data processing apparatus 405; data server 245 can be another apparatus 405; and, asset advisory tool 225 can be another apparatus 405.

In system 400, the data-processing apparatus 405 can include, but need not include each of, one or more central processor 410, a main memory store 415, an input/output controller 420, a keyboard 422, a pointing device 424 (e.g., mouse, trackball, stylus, etc.), a display device 426, and a mass storage component 428 (e.g., hard disk drive). Additional input/output devices like printing device 430 can also be included in data-processing apparatus 405.

The components of the data-processing apparatus 405 can communicate using a system bus 435 or other comparable communication medium supported by the architecture of data-processing apparatus 405.

In other exemplary embodiments, data processing apparatus 405 can comprise one or more processors in addition to central processor 410, one or more computer-readable memories in addition to main memory store 415, and/or one or more computer-readable, tangible storage devices in addition to mass storage component 428. In still other exemplary embodiments, the asset interface engine can comprise program instructions stored on at least one of the one or more storage devices. In still other exemplary embodiments, the asset interface engine can comprise program instructions stored on at least one of the one or more storage devices for execution by at least one of the one or more processors via at least one of the one or more memories.

FIG. 5 is a schematic diagram of a system 500 illustrating a computing device 505 for housing a data-processing apparatus, such as data-processing apparatus 405 of FIG. 4, in accordance with embodiments of the inventive arrangements disclosed herein. Computing device 505 can be a high-level representation of the client device 210 of FIG. 2.

In system 500, the computing device 505 can include a kernel or operating system 510 that manages interaction with the user 520 and various software applications 512 via an interface 514. The software applications 512 can represent a variety of computer programs that comprise program instructions for execution within the operating system 510. The software applications 512 can include the asset intelligence engine 230 in one embodiment.

The interface 514 can represent the hardware and/or software components that allow the user 520 to provide input to and/or receive output from the software application 512 and/or operating system 510. Examples of interface 514 can include, but are not limited to, a GUI, a WUI, a touch screen, a monitor, a command line, combinations therein, and the like. In one embodiment, the asset advisory tool user interface 215 is an interface 514.

FIG. 6 is a schematic diagram of a system 600 illustrating a networked computing environment that can be used to support operation of an asset intelligence engine in accordance with embodiments of the inventive arrangements disclosed herein. The asset intelligence engine can be asset intelligence engine 230 of FIG. 2. System 600 can be a high-level representation of the network architecture used in system 200. For example, network 602 can correspond to network 270; server 604/606 can correspond to data server 245 or asset advisory tool 225; storage 608 can correspond to data store 260; and, a client 610, 612, 614 can correspond to client device 210, in one embodiment.

In system 600, client devices 610, 612, and 614, servers 604 and 606, and a storage component 608 can communicate across a network 602. Client devices 610, 612, and 614 can represent a variety of computing devices capable of accessing software applications and/or services provided by servers 604 and 606 over the network 602. Examples of client devices 610, 612, and 614 can include, but are not limited to, desktop computers, smartphones, laptop computers, notebook computers, personal data assistants, and the like.

Servers 604 and/or 606 can represent computing devices configured to act as a provider for data, services, and/or shared resources. Servers 604 and/or 606 can be specialized for a specific function (e.g., an application server, an email server, etc.).

Data stored in storage 608 can be accessed via network 602 by either the servers 604 and 606 or the client computers 610, 612, and 614. As used herein, presented storage 608 can be a physical or virtual storage space configured to store digital information. Storage 608 can be physically implemented within any type of hardware including, but not limited to, a magnetic disk, an optical disk, a semiconductor memory, a digitally encoded plastic memory, a holographic memory, or any other recording medium. Storage 608 can be stand-alone storage units as well as a storage unit formed from a plurality of physical devices. Additionally, information can be stored within storage 608 in a variety of manners. For example, information can be stored within a database structure or can be stored within one or more files of a file storage system, where each file may or may not be indexed for information searching purposes. Further, storage 608 can utilize one or more encryption mechanisms to protect stored information from unauthorized access.

Network 602 can include any hardware/software/and firmware necessary to convey data encoded within carrier waves. Data can be contained within analog or digital signals and conveyed though data or voice channels. Network 602 can include local components and data pathways necessary for communications to be exchanged among computing device components and between integrated device components and peripheral devices. Network 602 can also include network equipment, such as routers, data lines, hubs, and intermediary servers which together form a data network, such as the Internet. Network 602 can also include circuit-based communication components and mobile communication components, such as telephony switches, modems, cellular communication towers, and the like. Network 602 can include line based and/or wireless communication pathways.

Figure 7:
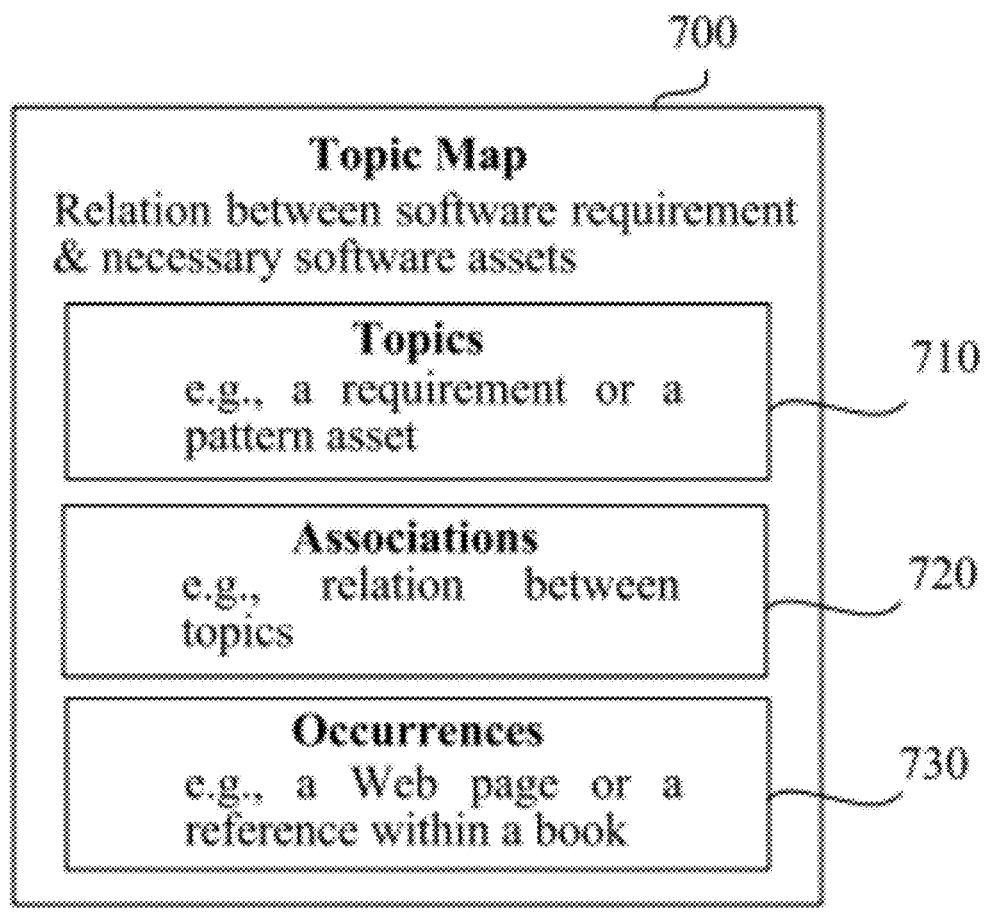
FIG. 7 is a block diagram illustrating the contents of a topic map in accordance with embodiments of the inventive arrangements disclosed herein.

FIG. 7 is a block diagram illustrating the contents of a topic map 700 in accordance with embodiments of the inventive arrangements disclosed herein. Topic map 700 can be utilized within the context of system 200 and/or in conjunction with method 100.

Topic map 700 can represent a generalized example of the formal standard ISO/IEC 13250:2003. A topic map 700 can be used to express the relationship between a software requirement and the necessary assets to fulfill that requirement.

The topic map 700 can include sections for topics 710, associations 720, and occurrences 730. Generally speaking, a topic 710 can represent any concept (i.e., person, place, thing, thought, etc.) In this instance of use, topics 710 can be used to represent the various software requirements and assets.

In the associations section 720, relationships can be defined between elements of the topics section 710. It should be noted that the types and meanings of the relationships used in the associations section 720 are defined within the ontology being used to express the topic map 700. Examples of relationships in association section 720 can include, but are not limited to, "is satisfied by", "has an occurrence of", "is cautioned with", and "is used with."

The occurrences section 730 can identify resources (i.e., other assets or topics) that are related to or reference the topic 710.

Figure 8:
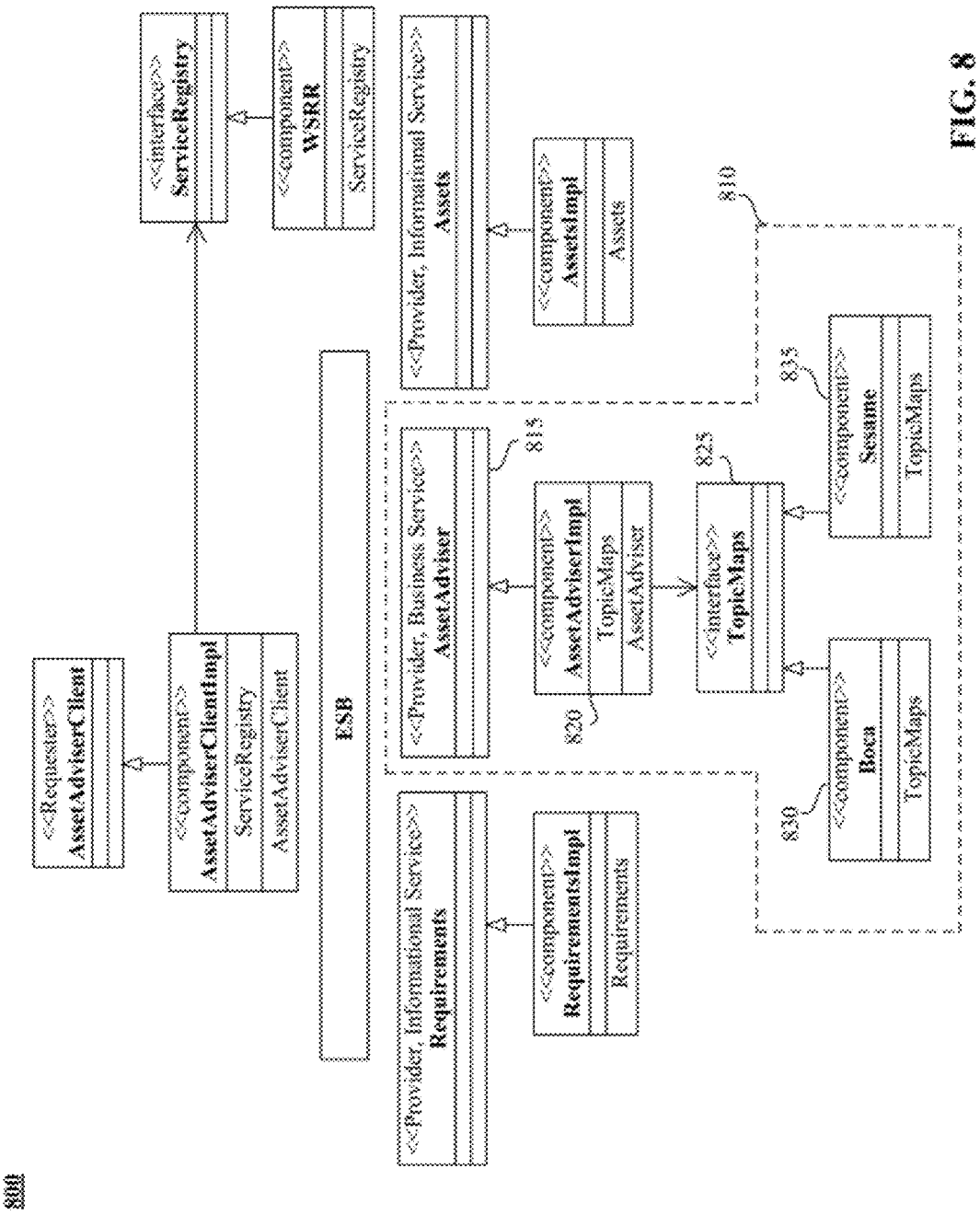
FIG. 8 is a data model expressing elements of an asset intelligence engine within an asset advisory tool in accordance with embodiments of the inventive arrangements disclosed herein.

FIG. 8 is a data model 800 expressing elements of an asset intelligence engine within an asset advisory tool in accordance with embodiments of the inventive arrangements disclosed herein. The asset intelligence engine can be asset intelligence engine 230 of FIG. 2 and the asset advisory tool can be asset advisory tool 225 of FIG. 2, in one embodiment. The data model 800 can represent a structure used by the semantic web repository 250 and data structure 260. Data model 800 can be utilized within the context of system 200 and/or in the performance of method 100.

As shown in this example, data model 800 can be expressed using the unified modeling language (UML). The functionality of the asset intelligence engine can be represented by the encapsulated elements 810 (those elements enclosed within the dashed lines).

The asset intelligence engine can be represented as a business service provider block 815 that can provide the business service "AssetAdviser". The business service provider block 815 can have a component block 820 called "AssetAdviserImpl" that represents the implementation of the "AssetAdviser" business service.

The "AssetAdviserImpl" component 820 can use an interface 825 called "TopicMaps". The "TopicMaps" interface 825 can interact with both a BOCA component 830 and a SESAME component 835, which are semantic Web repositories that can be used to store the semantic topic maps for use by the asset intelligence engine.

Figure 9:
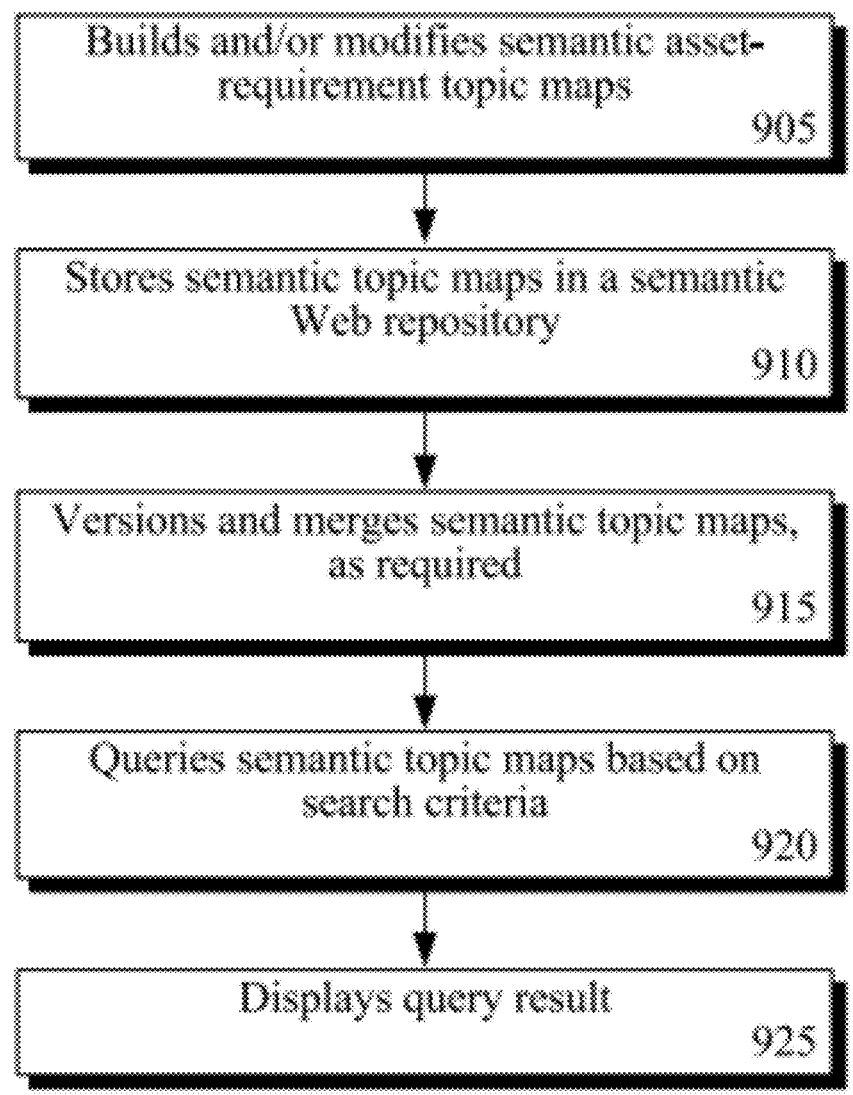
FIG. 9 is a flow chart of a method detailing the general functions of an asset intelligence engine in accordance with embodiments of the inventive arrangements disclosed herein.

FIG. 9 is a flow chart of a method 900 detailing the general functions of an asset intelligence engine in accordance with embodiments of the inventive arrangements disclosed herein. The asset intelligence engine can be asset intelligence engine 230 of FIG. 2.

Method 900 can begin in step 905 where the asset intelligence engine can build and/or modify semantic topic maps, such as semantic topic maps 255 of FIG. 2. The semantic topic maps can be stored in a semantic Web repository, such as semantic web repository 250 of FIG. 2, in step 910.

In step 915, the semantic topic maps can then be versioned and/or merged as required. Since authoring and/or viewing of the semantic topic maps can be restricted based upon user roles, the semantic topic maps authored at a more granular level can be merged into a broader topic map.

For example, a semantic topic map created by a user to express a specific type of Web service can be merged into a larger semantic topic map that represents SOA information services.

The actions of step 915 can be performed by the semantic Web repository. Step 915 can be alternately performed manually to address the case where the semantic Web repository does not support versioning and/or merging functions.

In step 920, the asset intelligence engine can query the semantic topic maps based on search criteria, such as search criteria 220 of FIG. 2. The query results (i.e., semantic results graph 240 of FIG. 2) can be presented to the user in step 925.

Figure 10:
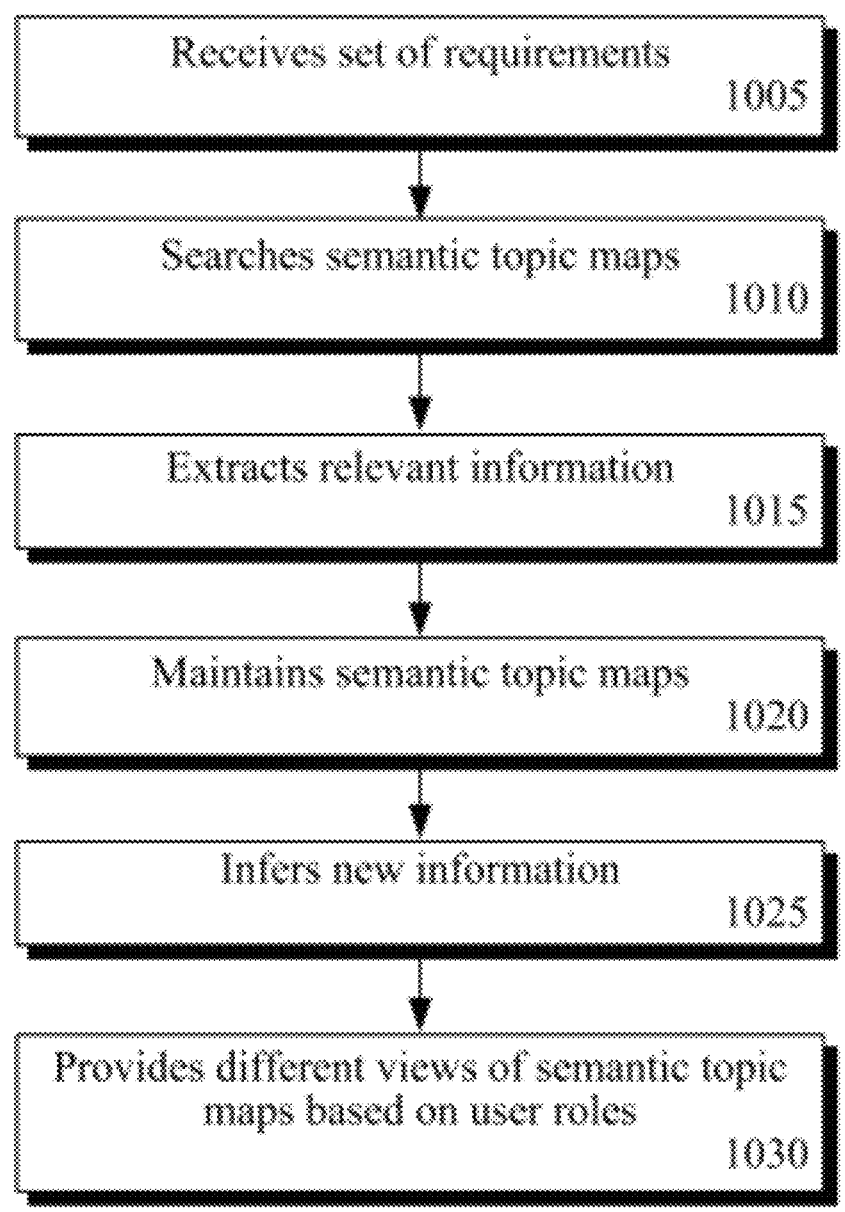
FIG. 10 is a flow chart of a method describing the basic functions performed by an asset intelligence engine in accordance with embodiments of the inventive arrangements disclosed herein.

FIG. 10 is a flow chart of a method 1000 describing the basic functions performed by an asset intelligence engine in accordance with embodiments of the inventive arrangements disclosed herein. The asset intelligence engine can be asset intelligence engine 230 of FIG. 2.

Method 1000 can begin in step 1005 wherein the asset intelligence engine can receive a set of requirements. For example, the requirements can be defined within search criteria 220 received from client device 210. The asset intelligence engine can search semantic topic maps, such as semantic topic maps 255 of FIG. 2, in step 1010 for those semantic topic maps that match the set of requirements.

The asset intelligence engine can extract relevant information about the semantic topic maps in step 1015. Relevant information can include information that matches the search criteria. In step 1020, the asset intelligence engine can maintain the semantic topic maps. New information can be inferred from the semantic topic maps in step 1025. For example, an inference engine, such as inference engine 235, of the asset intelligent engine can infer new information based on the criteria and relationships between reusable software assets, such as reusable software assets 265. In step 1030, the asset intelligence engine can provide different views of a semantic topic map based upon the user's role. For example, a user's role (manager, project leader, lead developer, etc.) can be a variable that drives decisions of the inference engine, as noted by step 135 of method 100.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for providing intelligent recommendations of reusable software assets comprising:
    a computer receiving at least one user-entered search criteria representing at least one requirement for a software solution, a user-selected filter for search results, and a reusable software asset identifier;
    the computer identifying a set of at least one semantic topic map associated with the at least one user-entered search criteria, wherein the set of at least on topic map is a subset of a plurality of semantic topic maps, wherein each semantic topic map of the plurality defines at least one semantic relationship between topics, wherein a topic represents one of a requirement and a reusable software asset, and, wherein each semantic topic map of the plurality is written in accordance with a semantic framework using a Web ontology language and is stored in a semantic Web repository;
    the computer inferring from the set of at least one identified semantic topic map a set of at least one inferred data item representing at least one of an auxiliary data relationship to a topic contained in a semantic topic map that is not a member of the set of at least one identified semantic topic map and an applicable auxiliary data element from a semantic topic map that is not a member of the set of at least one identified semantic topic map;
    the computer aggregating contents of the set of at least one identified semantic topic map and the set of at least one inferred data item into a results table; and
    the computer synthesizing a semantic results graph from the results table, wherein said semantic results graph is a pictorial representation of semantically related topics contained in the results table, wherein the semantic results graph is able to be rendered within a display area of an associated user interface.

2. The method of claim 1, wherein identifying the set of at least one semantic topic map further comprises:
    the computer generating a query statement in a query language supported by the semantic framework and the Web ontology language, wherein said query statement encompasses the received user-entered search criteria; and
    executing said query statement upon the semantic Web repository containing semantic topic maps.

3. The method of claim 1, wherein the inferring of the set of at least one inferred data item utilizes a semantic Web inference engine.

4. The method of claim 1, wherein the semantic framework is a resource description framework (RDF).

5. The method of claim 1, wherein the aggregation of the results table further comprises:

the computer identifying a role for a user having provided the at least one user-entered search criteria, wherein said role defines access limitations to reusable software assets for the user;

the computer comparing the identified user role with a role list for each reusable software asset contained in the results table, wherein said role list defines user roles allowed to access the reusable software asset; and the computer, when the identified user role is absent from the role list of the reusable software asset, removing an entry for the reusable software asset and any dependent entries associated with the reusable software asset from the results table, whereby the results table is filtered based upon the user's role.

6. The method of claim 1, wherein, when the at least one user-entered search criteria includes at least one user-selected filter, the aggregation of the results table further comprises:

the computer removing from the results table entries matching the at least one user-selected filter.

7. The method of claim 1, wherein the synthesizing of the semantic results graph further comprises:

the computer identifying entries of the results table as key data nodes, wherein a key data node represents a data element to be graphically presented in the semantic results graph, wherein key data nodes are defined as being at least one of a predetermined edge distance and a predetermined nodal distance away from a root data node; and the computer, for each key data node, retrieving at least one item of metadata associated with the key data node.

8. The method of claim 7, further comprising:

in response to user-activation of an interactive GUI element associated with a key data node presented in the semantic results graph, the computer supplying the retrieved at least one item of metadata for presentation within the rendering of the semantic results graph within the user interface.

9. The method of claim 7, wherein the at least one item of metadata comprises at least one of a file name associated with the key data node, a universal resource locator (URL) representing a location of an electronic file associated with the key data node, an identifier of an owner of the electronic file associated with the key data node, a data type of the key data node, and a version identifier of the electronic file associated with the key data node.

10. A computer program product comprising one or more computer-readable, tangible storage devices and computer-readable program instructions which are stored on the one or more storage devices and when executed by one or more processors, perform the method of claim 1.

11. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

12. A computer system for providing intelligent recommendations of reusable software assets, the computer system comprising:

one or more processors, one or more computer-readable memories and one or more computer-readable, tangible storage devices, wherein the one or more computer-readable, tangible storage devices comprise a plurality of semantic topic maps that define relationships between topics, wherein a topic represents one of a requirement and a reusable software asset, and, wherein the semantic topic map is written in accordance with a semantic framework using a Web ontology language;

program instructions, stored on at least one of the one or more storage devices for execution by at least one of the one or more processors via at least one of the one or more memories, to provide guidance for selection of reusable software assets in designing a software solution; and program instructions, stored on at least one of the one or more storage devices for execution by at least one of the one or more processors via at least one of the one or more memories, to synthesize a semantic results graph from semantic topic maps determined as applicable to at least one user-provided search criteria, wherein the semantic results graph is a pictorial representation of semantic relationships between topics of the applicable semantic topic maps.

13. The computer system of claim 12, wherein said one or more computer-readable, tangible storage devices comprise a semantic Web repository for housing the plurality of semantic topic maps.

14. The computer system of claim 12, further comprising:

program instructions, stored on at least one of the one or more storage devices for execution by at least one of the one or more processors via at least one of the one or more memories, to accept entry of the at least one user-provided search criteria;

program instructions, stored on at least one of the one or more storage devices for execution by at least one of the one or more processors via at least one of the one or more memories, to present the semantic results graph.

15. The computer system of claim 12, further comprising:

program instructions, stored on at least one of the one or more storage devices for execution by at least one of the one or more processors via at least one of the one or more memories, to apply reasoning logic to the applicable semantic topic maps in order to derive implicit data relationships for use in synthesizing the semantic results graph.

16. The computer system of claim 12, further comprising:

program instructions, stored on at least one of the one or more storage devices for execution by at least one of the one or more processors via at least one of the one or more memories, to allow creation and modification of the plurality of semantic topic maps.

17. A computer program product for providing intelligent recommendations of reusable software assets, the computer program product comprising:

one or more computer-readable, tangible storage devices;

program instructions, stored on at least one of the one or more storage devices, to obtain a plurality of semantic topic maps, wherein a semantic topic map defines at least one semantic relationship between topics, wherein a topic represents one of a requirement and a reusable software asset, and, wherein the semantic topic map is written in accordance with a semantic framework using a Web ontology language and stored in a semantic Web repository;

program instructions, stored on at least one of the one or more storage devices, to receive at least one user-entered search criteria representing at least one requirement for a software solution, a user-selected filter for search results, and a reusable software asset identifier;

program instructions, stored on at least one of the one or more storage devices, to identify a set of at least one semantic topic map associated with the at least one user-entered search criteria;

program instructions, stored on at least one of the one or more storage devices, to infer from the set of at least one identified semantic topic map a set of at least one inferred data item representing at least one of an auxiliary data relationship to a topic contained in a semantic topic map that is not a member of the set of at least one identified semantic topic map and an applicable auxiliary data element from a semantic topic map that is not a member of the set of at least one identified semantic topic map;

program instructions, stored on at least one of the one or more storage devices, to aggregate contents of the set of at least one identified semantic topic map and the set of at least one inferred data item into a results table;

program instructions, stored on at least one of the one or more storage devices, to synthesize a semantic results graph from the results table, wherein said semantic results graph is a pictorial representation of semantically related topics contained in the results table; and program instructions, stored on at least one of the one or more storage devices, to render the semantic results graph within a display area of an associated user interface.

18. The computer program product of claim 17, further comprising:

program instructions, stored on at least one of the one or more storage devices, to generate a query statement in a query language supported by the semantic framework and the Web ontology language, wherein said query statement encompasses the received user-entered search criteria; and program instructions, stored on at least one of the one or more storage devices, to execute said query statement upon the semantic Web repository containing semantic topic maps.

19. The computer program product of claim 17, wherein the program instructions to aggregate:

identify a role for a user having provided the at least one user-entered search criteria, wherein said role defines access limitations to reusable software assets for the user;

compare the identified user role with a role list for each reusable software asset contained in the results table, wherein said role list defines user roles allowed to access the reusable software asset; and when the identified user role is absent from the role list of the reusable software asset, remove an entry for the reusable software asset and any dependent entries associated with the reusable software asset from the results table, whereby the results table is filtered based upon the user's role.

20. The computer program product of claim 17, wherein the at least one user-entered search criteria include at least one user-selected filter, and wherein the program instructions to aggregate remove from the results table entries matching the at least one user-selected filter.

21. The computer program product of claim 17, further comprising:

program instructions, stored on at least one of the one or more storage devices, to identify entries of the results table as key data nodes, wherein a key data node represents a data element to be graphically presented in the semantic results graph, wherein key data nodes are defined as being at least one of a predetermined edge distance and a predetermined nodal distance away from a root data node; and program instructions, stored on at least one of the one or more storage devices, to, for each key data node, retrieve at least one item of metadata associated with the key data node.

22. The computer program product of claim 21, further comprising:

program instructions, stored on at least one of the one or more storage devices, to, in response to user-activation of an interactive GUI element associated with a key data node presented in the semantic results graph, supply the retrieved at least one item of metadata for presentation within the rendering of the semantic results graph within the user interface.

* * * * *